United States Patent
Bouba et al.

(10) Patent No.: US 12,241,455 B2
(45) Date of Patent: Mar. 4, 2025

(54) METHOD OF CONTROLLING A WIND FARM USING A REINFORCEMENT LEARNING METHOD

(71) Applicants: IFP Energies nouvelles, Rueil-Malmaison (FR); INSTITUT DE RECHERCHE EN INFORMATIQUE ET EN AUTOMATIQUE, Le Chesnay-Rocquencourt (FR)

(72) Inventors: Eva Bouba, Rueil-Malmaison (FR); Donatien Dubuc, Rueil-Malmaison (FR); Jiamin Zhu, Rueil-Malmaison (FR); Claire Bizon Monroc, Paris (FR); Ana Busic, Paris (FR)

(73) Assignees: IFP ENERGIES NOUVELLES;, Rueil-Malmaison (FR); INSTITUT DE RECHERCHE EN INFORMATIQUE ET EN AUTOMATIQUE, Le Chesnay-Rocquencourt (FR)

( * ) Notice: Subject to any disclaimer, the term of this patent is extended or adjusted under 35 U.S.C. 154(b) by 0 days.

(21) Appl. No.: 18/524,013

(22) Filed: Nov. 30, 2023

(65) Prior Publication Data
US 2024/0183337 A1    Jun. 6, 2024

(30) Foreign Application Priority Data
Dec. 5, 2022 (FR) ...................... 2212772

(51) Int. Cl.
*F03D 7/04* (2006.01)
*F03D 7/02* (2006.01)
(52) U.S. Cl.
CPC ........... *F03D 7/048* (2013.01); *F03D 7/0204* (2013.01); *F03D 7/046* (2013.01); *F05B 2270/8042* (2013.01)

(58) Field of Classification Search
CPC ........ F03D 7/048; F03D 7/046; F03D 7/0204; F05B 2270/8042
See application file for complete search history.

(56) References Cited

U.S. PATENT DOCUMENTS

| 8,108,079 | B2 * | 1/2012 | Wobben | ................... H02J 11/00 700/286 |
| 8,839,656 | B2 * | 9/2014 | Frederiksen | ............ F03D 7/048 416/61 |

(Continued)

FOREIGN PATENT DOCUMENTS

| EP | 3438448 A1 | 2/2019 |
| EP | 3997335 A1 | 5/2022 |

(Continued)

OTHER PUBLICATIONS

French Patent Office; Search Report in corresponding French application No. 2212772, dated Jun. 7, 2023; 2 pages.

(Continued)

*Primary Examiner* — Michael L Sehn
(74) *Attorney, Agent, or Firm* — Fitch, Even, Tabin & Flannery LLP (57) ABSTRACT

The present invention is a wind farm control method, wherein a reinforcement learning method (RL) is implemented in a decentralized manner (for each wind turbine). The reward (REC) is calculated according to a wake propagation delay (DEL). Thus, the reward is truly representative of the effect of the last action (previous yaw control for example).

20 Claims, 6 Drawing Sheets

(56) References Cited

U.S. PATENT DOCUMENTS

| | | | |
|---|---|---|---|
| 2007/0124025 A1* | 5/2007 | Schram | F03D 7/0276 290/44 |
| 2022/0186709 A1 | 6/2022 | Chen et al. | |
| 2022/0307468 A1 | 9/2022 | Gollnick | |

FOREIGN PATENT DOCUMENTS

| | | |
|---|---|---|
| WO | 2015136687 A1 | 9/2015 |
| WO | 2021/052669 A1 | 3/2021 |

OTHER PUBLICATIONS

Z. Xu et al, "Model-free optimization scheme for efficiency improvement of wind farm using decentralized reinforcement learning, IFAC-Papers OnLine, vol. 53, No. 2, pp. 12103±12108, 2020. 21st IFAC World Congress".

Stanfel, K. et al, "A distributed reinforcement learning yaw control approach for wind farm energy capture maximization", in 2020 American Control Conference (ACC), pp. 4065±4070, 2020.

Tuhfe et al, "Possible Power Estimation of Down-Regulated Offshore Wind Power Plants", Possible Power Estimation of Down-Regulated Offshore Wind Power Plants, Dec. 31, 2015 (Dec. 31, 2015-), pp. 1-161, XP055492230.

S. Vijayshankar et al., "Deep reinforcement learning for automatic generation control of wind farms", in 2021 American Control Conference (ACC), pp. 1796±1802, 2021.

H. Dong et al., "Intelligent wind farm control via deep reinforcement learning and high-fidelity simulations", Applied Energy, vol. 292, No. C, 2021.

C. Watkins et al. "Technical Note—Q-learning, Machine Learning" 8, 279-292 (1992), 1992 Kluwer Academic Publishers, Boston, Manufactured in the Netherlands.

* cited by examiner

METHOD OF CONTROLLING A WIND FARM USING A REINFORCEMENT LEARNING METHOD

CROSS-REFERENCE TO RELATED APPLICATIONS

Reference is made to French Patent Application No. 2212772 filed Dec. 5, 2022, which is incorporated herein by reference in its entirety.

BACKGROUND OF THE INVENTION

Field of the Invention

The present invention concerns the field of wind farm control for maximizing the power generated.

Description of the Prior Art

A wind farm, also referred to as wind park or wind power plant, is a group of wind turbines that produce electricity. They may be located either onshore or offshore. A distinction is thus made between onshore wind farms and offshore wind farms, such as at sea.

The wind turbines of these farms are generally horizontal-axis turbines provided with a system for orienting the horizontal rotational axis in the direction of the wind, to maximize the energy recovered by the turbine. A wind turbine allows the kinetic energy from the wind to be converted into electrical or mechanical energy. For wind energy conversion to electrical energy, the wind turbine is made up of the following elements:
- a tower allowing a rotor to be positioned at a sufficient height to enable motion thereof (necessary for horizontal-axis wind turbines) or allowing the rotor to be positioned at a height enabling being driven by a stronger and more regular wind than at ground level. The tower generally houses part of the electrical and electronic components (modulator, control, multiplier, generator, etc.);
- a nacelle mounted at the top of the tower, housing mechanical, pneumatic components and some electrical and electronic components necessary to operate the machine (modulator, control, multiplier, generator, etc.). The nacelle can rotate to orient the rotor in the right direction;
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electric generator) that converts the energy recovered to electrical energy. The rotor is potentially provided with control systems such as a variable-angle blades or aerodynamic brakes; and
- possibly a transmission, notably made up of two shafts (mechanical shaft of the rotor and mechanical shaft of the electrical machine) connected by a multiplier (gearbox).

Since the early 1990s, there has been renewed interest in wind power, in particular in the European Union where the annual growth rate is about 20%. This growth is attributed to the inherent possibility for carbon-free electricity generation. In order to sustain this growth, the energy yield of wind turbines and wind farms still needs to be further improved. The prospect of wind power production increase requires developing effective production tools and advanced control tools to improve the performances of the machines. Wind turbines are designed to generate electricity at the lowest possible cost.

For this power regulation, controllers have been designed for variable-speed wind turbines. The purpose of the controllers is to maximize the electrical power recovered, to minimize the rotor speed fluctuations, and to minimize the fatigue and extreme moments of the structure (blades, tower and platform).

Wind farms are subject to a phenomenon commonly referred to as "wake effect", when the disturbances generated by the turbines located upstream from the wind park create suboptimal electricity generation conditions for the other turbines. Indeed, a turbulent wake forms downstream from the turbine, and the average wind speed is decreased in this wake because the turbine has captured part of the kinetic energy of the wind, and the intensity of the turbulence is increased.

Figure 1:
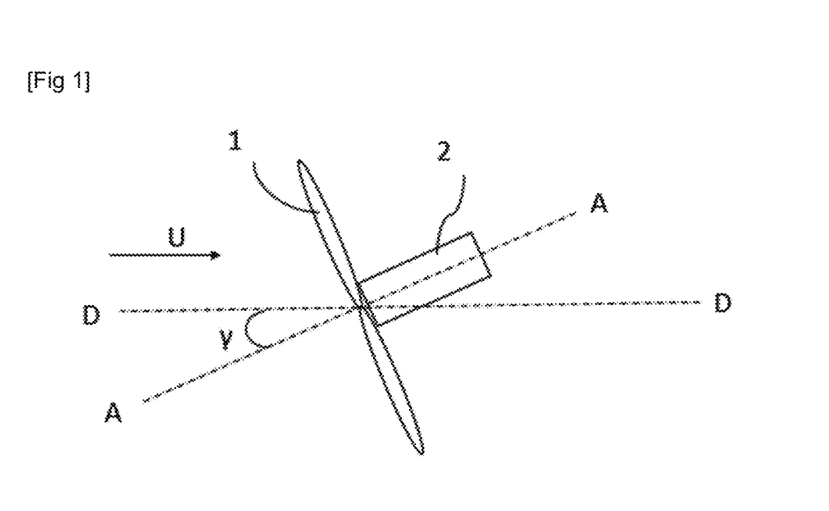
FIG. 1, already described, illustrates the yaw angle of a wind turbine.

A common strategy for maximizing the energy generation of a wind turbine orients the rotor thereof to face the wind. The angle between the rotor and the wind direction, known as yaw angle, is then 0°. FIG. 1 schematically illustrates the yaw angle by way of non-limitative example. FIG. 1 is a top view of a wind turbine. The turbine comprises blades 1 and a nacelle 2, oriented in a direction AA. The wind is represented by arrow U having a direction DD. The angle $\gamma$ between direction AA and direction DD is the yaw angle. When the rotor of the turbine is aligned with the wind direction, this angle $\gamma$ is zero.

However, in wind parks, applying this strategy (zero yaw angle) to all the turbines, according to a method referred to as "greedy", makes the park subject to the so-called wake effect which is when a wind turbine extracts energy from the wind, the downstream wind speed decreases and its turbulence increases. This leads to suboptimal conditions for the energy generation of turbines located downstream, and the total production losses can reach 40% at sea. A certain number of controllable actuators can be used to reduce this effect since power capture can be impacted by controlling the orientation of the blades or the generator torque, the wake of a turbine can be deflected below the downstream turbines by inclining the rotor plane, or on the side by modifying the yaw, a technique known as wake steering.

To correct this problem, a strategy uses the yaw actuators to misalign the turbines with respect to the incident wind direction, which enables wake redirection to limit the impact on the downstream turbines. Finding the optimal yaw angles (maximizing the total electrical power of the wind farm) is a complex problem.

For this complex problem, conventional control approaches may be considered which use a wind propagation model in a wind park, and they optimize the yaw angles in relation to this approximation. Various models using analytical approximations or numerical calculations have been proposed, but such models however lack precision and they disregard the turbulent wind dynamics and the wake propagation which leads to a poor estimation of the wake effects in wind parks. There are higher-fidelity models that take account of wake advection, deflection, meandering and merging. However, they are time and computing resources consuming, which discourages their use for real-time optimization.

It is possible to overcome such constraints using model-free methods. Reinforcement learning (RL) is one example thereof. Its methods learn by trial and error, and they deduce optimal actions only by observing the responses of a system to input changes. This online learning approach is particularly interesting due to the modeling uncertainties that make it necessary to forget in the field some suboptimal behaviors learnt in modeling. The combination with a decentralized approach is however not obvious since decentralized algorithms limit the observability of the problem for each turbine, making their environment non-stationary. During this time, the wind propagation dynamics prevent observation of the impact of a controller until the wake has propagated downstream, and they make assigning the power variation to the right controller more difficult due to the cumulative effect of the multiple wakes.

Reinforcement learning methods have also been used for automatic production control via yaw control for a wind park. See "S. Vijayshankar, P. Stanfel, J. King, E. Spyrou and K. Johnson, Deep Reinforcement Learning for Automatic Generation Control of Wind Farms, in 2021 American Control Conference (ACC), pp. 1796±1802, 2021" uses the centralized deep learning algorithm DDPG (Deep Deterministic Policy Gradient) with the axial induction factor as the control variable "H. Dong, J. Zhang and X. Zhao, Intelligent Wind Farm Control via Deep Reinforcement Learning and High-Fidelity Simulations, Applied Energy, vol. 292, No. C, 2021". The DDPG is combined with offline supervised learning, which leads to a significant increase in the rated output power in high-fidelity wind park simulations. The dimension of the problem related to these centralized methods however increases with the number of turbines, which raises the question of the extendibility to larger wind farms. In particular, Dong et al., 2021, exploit a symmetry specific to the layout of the turbines in their use case to reduce the dimension of the problem, but this cannot be transferred to other farm layouts.

To solve this problem, decentralized learning methods have been tested, and they have led to a significant increase in the total electricity generation in several wind park simulations. However, most of these methods disregard the wake propagation delays in the wind park. See "Z. Xu, H. Geng, B. Chu, M. Qian and N. Tan, Model-Free Optimization Scheme for Efficiency Improvement of Wind Farm Using Decentralized Reinforcement Learning, IFAC-PapersOnLine, vol. 53, No. 2, pp. 12103±12108, 2020. 21st IFAC World Congress"). These methods have been tested on simulators that disregard wake propagation delays. Now, if these methods are applied by taking account of the wake propagation delays, they are no longer as efficient, notably for convergence and for the power output. Moreover, it is shown in "P. Stanfel, K. Johnson, C. J. Bay and J. King, A Distributed Reinforcement Learning Yaw Control Approach for Wind Farm Energy Capture Maximization", in 2020 American Control Conference (ACC), pp. 4065±4070, 2020", that efficient yaw control methods can be made completely inoperative when the wake propagation delay is taken into account in more realistic simulations.

Patent applications EP-3,997,335 and US2022/186,709 also describe reinforcement learning methods. However, none of these methods enables management of the wake propagation delay in the wind farm. Furthermore, in patent application EP-3,997,335, only a portion of a wind farm is considered, which does not allow optimal control of the whole wind farm. Moreover, in U.S. patent application 2022/186,709, the goal achieved concerns the stabilization of the wind park output power under various wind conditions. Thus, this method does notably not enable maximization of the output power.

Few strategies have been used to process the wake propagation delay in wind park optimization problems. In the aforementioned Dong et al., 2021, the problem is delegated to a learning algorithm that learns to predict the impact of a yaw change from measurements performed at constant yaw prior to deployment in the wind park. This however decouples the reward signal from the current output of the wind farm, which limits the algorithm adaptability and makes it vulnerable to the failure of an individual turbine. In the aforementioned document (Stanfel et al., 2020), the wind park is partitioned into subsets within which one turbine at a time is allowed to change yaw, a strategy known as "locking". However, this locking strategy slows the convergence down excessively for all the agents.

SUMMARY OF THE INVENTION

The invention controls a wind farm in real time in order to maximize the electrical power generated thereby regardless of the implementation of wind turbines in the wind farm with fast convergence. The present invention therefore concerns a wind farm control method wherein a reinforcement learning method is implemented in a decentralized manner (for each wind turbine), where the reward is calculated according to a wake propagation delay. Thus, the reward is truly representative of the effect of the last action (previous yaw control), which allows maximizing the power generated by the wind farm. Implementing a reinforcement learning method for each wind turbine enables adaptation of the method to any wind farm, and it also provides fast convergence.

Furthermore, the invention relates to a wind farm capable of implementing the control method.

The invention concerns a wind farm control method with each turbine of the wind farm comprising an actuator for modifying an operating point of the turbine notably according to the yaw angle of the turbine in which the yaw angle is the angle formed between the rotor of the wind turbine and a wind direction. For this method, the following steps are carried out:
  a. acquiring power generated by each wind turbine, a wind speed and direction, and the yaw angle of each turbine;
  b. for each wind turbine, determining a wake propagation delay for the turbine, according to the acquired wind speed and direction, and to a layout of the wind turbines within the wind farm;
  c. for each wind turbine, determining a value for a reward representing an impact of a control of the turbine, notably on the sum of the powers generated by all the turbines of the wind farm, in which the reward is calculated by accounting for the determined wake propagation delay;
  d. for each wind turbine, applying a reinforcement learning method to determine a target operating point of the turbine according to the determined reward and to the previous yaw angle; and
  e. controlling the operating point of each wind turbine by applying the determined target operating point using the actuator.

According to an embodiment, the wake propagation delay is determined by use of a Taylor's frozen turbulence hypothesis.

According to an implementation, the wake propagation delay is determined by accounting for a wake distance limit.

Advantageously, the reinforcement learning method is a Watkins Q-learning method.

According to an aspect, for each wind turbine, the reward is determined when the time elapsed since the last control is greater than the determined wake propagation delay.

According to a configuration, the yaw angle control is a variation of a fixed pitch of the yaw angle.

Advantageously, the wind speed and the wind direction are acquired by measuring with a LiDAR sensor or an anemometer, or by means of a real-time control and data acquisition system.

According to an embodiment, the acquired yaw angle is the previous controlled yaw angle.

According to an implementation, the reward is determined by accounting for an average of the powers generated during a predetermined time interval.

Furthermore, the invention concerns a wind farm where each wind turbine of the wind farm comprises an actuator for modifying an operating point of the turbine, notably the yaw angle of the turbine with the yaw angle being the angle formed between the rotor of the turbine and a wind direction. The wind farm comprises computing capability for implementing the wind farm control method according to one of the aforementioned features.

BRIEF DESCRIPTION OF THE DRAWINGS

Other features and advantages of the method and of the system according to the invention will be clear from reading the description hereafter of embodiments given by way of non-limitative example, with reference to the accompanying figures wherein.

DETAILED DESCRIPTION OF THE INVENTION

The present invention concerns a method for real-time control of a wind farm. A wind farm, also referred to as wind park or wind power plant, is a group of wind turbines that generate electricity. Each wind turbine of the wind farm comprises an actuator for modifying an operating point of the turbine. An example of an operating point can be the yaw angle of the turbine. Other operating points can notably be speed governing of the turbine, or modifying the power curve of the turbine. The position of the turbines within the wind farm, also referred to as wind turbine layout or wind turbine implementation, is previously known.

In the rest of the description, only the yaw angle control is described with it being understood that other operating points can however be controlled.

The method according to the invention comprises the following steps:
1) Acquiring the powers generated, the wind speed and direction, the yaw angles
2) Determining the wake propagation delay of each wind turbine
3) Determining a reward for each wind turbine
4) Applying a reinforcement learning method for each wind turbine
5) Controlling each wind turbine.

Steps 2 to 4 can be carried out by a computing system, notably a computer, a processor or a calculator. The steps are detailed in the description below. The steps are carried out in parallel for each wind turbine so that the method is decentralized. Furthermore, the method uses no physical model, and it is based on the real data measured within the wind farm, which makes it competitive in terms of computing time, representativity and accuracy. These steps are carried out continuously in real time and are repeated at each time step.

Figure 2:
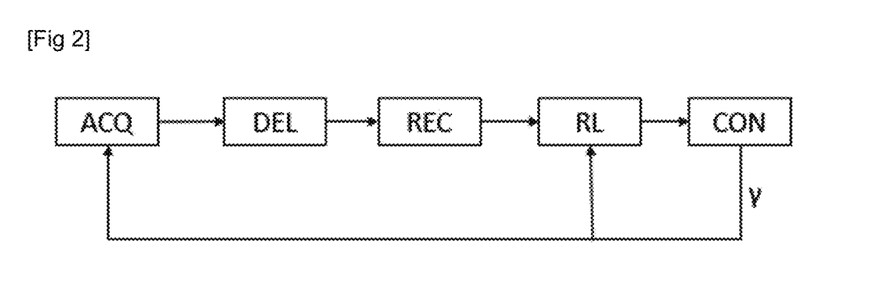
FIG. 2 illustrates the steps of the control method according to an embodiment of the invention.

FIG. 2 schematically illustrates, by way of non-limitative example, the steps of the wind farm control method according to an embodiment of the invention. The undetermined power generated by all the turbines of the wind farm, the wind speed and direction, and yaw angles ($\gamma$) of the turbines are acquired (ACQ). A wake propagation delay (DEL) of the wind turbine is determined for each turbine of the wind farm as a function of the wind speed and direction, and of the position of the turbines. For each turbine, a reward (REC) representing the impact of a control of the turbine on the sum of the power generated is determined by accounting for the propagation delay. A reinforcement learning method (RL) is applied to each wind turbine in order to determine a yaw angle of the target turbine (or a target operating point), from a previous yaw angle ($\gamma$) (or a previous operating point) and the determined reward. Each wind turbine is controlled (CON) by applying the target yaw angle (or the target operating point) to the turbine.

1) Acquiring the Powers Generated, the Wind Speed and Direction, the Yaw Angles

This step acquires, uses measuring or uses estimation means:
the electrical power generated by each wind turbine
the wind speed, notably the undisturbed wind speed measured at the wind farm inlet
the wind direction, notably the wind direction at the wind farm inlet, and
the yaw angle of each wind turbine.

According to an embodiment, the wind speed and direction can be measured, notably by a LiDAR (Light Detection And Ranging) sensor, an anemometer, or measurements performed using a real-time control and data acquisition SCADA (Supervisory Control And Data Acquisition) system, or any similar sensor. A real-time control and data acquisition SCADA system is a large-scale remote control system allowing real-time processing of a large number of remote measurements and remote control of the technical facilities. It is an industrial technology in the field of instrumentation, whose implementations can be considered as instrumentation structures including a middleware type layer. The undisturbed wind speed at the wind farm inlet can be deduced from these measurements with the wind farm inlet being defined as a function of the wind direction.

According to an implementation, the electrical power generated by each wind turbine can be measured by the real-time control and data acquisition SCADA system, or by current and voltage measurements delivered by each turbine.

According to an aspect of the invention, the acquired yaw angle of each turbine can be the yaw angle controlled at a previous time. Alternatively, the yaw angle can be measured by a sensor which notably may be an angle sensor.

2) Determining the Wake Propagation Delay of Each Wind Turbine

This step determines, for each wind turbine, a propagation delay for the wake formed by the turbine, as a function of the wind speed and direction (acquired in step 1), and of the implementation of the turbines within the wind farm. The wake effect corresponds to the disturbances and turbulences formed by a wind turbine in the wind flow. The wake formed by a turbine impacts the turbines downstream from this turbine in the direction of the wind. The implementation of the wind turbines corresponds to the layout of the turbines within the wind farm. In other words, the wind turbine implementation corresponds to the relative position of the turbines within the wind farm. The wind turbine implementation and the wind direction allow determination of the turbines downstream and upstream from each turbine. This step accounts for the wake propagation delay in wind park optimization problems.

According to an embodiment of the invention, the wake propagation delay can be approximated for each wind turbine using Taylor's frozen turbulence hypothesis. For example, the propagation delay $d_{i,j}$ from upstream turbine i to a downstream turbine j can be determined with the following formula:

$$d_{i,j} = \frac{c_{i,j}}{u^\infty}$$

with $c_{i,j}$ being the distance between turbines i and j being along the wind direction axis, and $u^\infty$ being the undisturbed wind speed measured at the wind farm inlet (obtained in step 1).

According to an implementation of this embodiment of the invention, the propagation delay formula can comprise a multiplying coefficient greater than 1.

As a variant, the propagation delay formula accounts for induction zones upstream from the rotor, which allows relaxing the frozen turbulence hypothesis with a more realistic duration taking account of the associated decelerations.

According to an aspect of the invention, determination of the wake propagation delay can account for a wake distance limit. Indeed, the disturbances in the wind field due to a turbine i become less significant as the distance to the rotor thereof increases, and the wind again encounters conditions similar to the free flow at the farm inlet with its wake effect being negligible beyond a given distance. Thus, due to this distance limit, the delay of propagation to any turbine j located beyond this distance may not be taken into account to calculate the reward delivery delay.

For example, a wake propagation delay matrix $D_{i,j}$ can be determined for each turbine pair (i, j) of the wind farm. This wake propagation delay matrix $D_{i,j}$ can be written for all turbine pairs i, j with $0 \leq i, j \leq M$, with M being the number of turbines of the wind farm:

$$D_{i,j} = \begin{cases} m \times d_{i,j}, & \text{if } j \text{ downstream from } i \text{ and } c_{i,j} \leq d_{lim} \\ 0 & \text{otherwise} \end{cases}$$

with m being a multiplying coefficient greater than 1, $d_{i,j}$ being the propagation delay (resulting from Taylor's frozen turbulence hypothesis for example) from upstream turbine i to a downstream turbine j, $c_{i,j}$ being a distance between the two turbines i and j along the wind direction axis, and $d_{lim}$ being a wake distance limit.

3) Determining a Reward for Each Wind Turbine

This step determines, for each wind turbine, a value of a reward representing the impact of a control of the turbine notably on the sum of the powers generated by all the turbines of the wind farm. The reward is determined as a function of the wake propagation delay determined in step 2. The reward is a parameter of the reinforcement learning method that is described in step 4. In other words, the reward is a value of a reward function of a reinforcement learning method described in step 4. The reward associated with a state enables the method to automatically learn an action. If the reward is positive, the action taken previously is favorable, which favors this action by machine learning. Given that a modification in a yaw angle of a wind turbine (or any other operating point) has a delayed impact on the downstream turbines, the reward is determined late according to the wake propagation delay determined in step 2.

According to an embodiment, the reward is determined by measuring the energy generation of the wind turbines downstream from a turbine considered at the time of the impact estimated by use of the propagation delay. Thus, the present invention allows reducing uncertainties. Each wind turbine therefore receives a different reward function according to its location in the wind park. Finally, in order to reduce the influence of the rated power on the evaluation of the impact of the various yaws, increases in percentage rather than in gross value can be taken into account. The sign of the measured variation can be used as the reward signal, and a threshold can be applied to filter the noise. For example, a reward ri, k can be defined for each turbine i (ranging between 1 and M, with M being the number of turbines of the wind farm), for each time step k:

$$r_{i,k} = \begin{cases} 1 & \text{if } \frac{V_{i,2} - V_{i,1}}{V_{i,1}} > \delta \\ -1 & \text{if } \frac{V_{i,2} - V_{i,1}}{V_{i,1}} \leq -\delta \\ 0 & \text{otherwise} \end{cases}$$

with $\delta$ being a positive threshold, $V_{i,1} = \Sigma_{j=1}^{M} P_{j,k}$ and $V_{i,2} = \Sigma_{j=1}^{M} P_{j,k+D_{i,j}}$, $P_{j,k}$ being the power generated by wind turbine j at time step k, $P_{j,k+D_{i,j}}$ being the power generated by wind turbine j at time step k to which is added wake propagation delay $D_{i,j}$ between turbine i and j (determined in the previous step). Thus, the reward is positive if the sum of the powers has increased by a (positive) quantity greater than a positive threshold, the reward is negative if the sum of the powers has decreased by a quantity less than or equal to a negative threshold, and the reward is zero in the interval.

Furthermore, to take account of the instantaneous power variation due to the wind turbulence, the measurements of the power generated by each wind turbine can be averaged: by defining $\lambda \geq 1$ the size of the average window. In other words, the reward can be determined by taking account of an average of the powers generated by the wind turbines during a predetermined time interval (size of the average window λ).

According to an implementation of the invention, the reward can be determined for each wind turbine if the time elapsed since the last previous control is greater than the determined wake propagation delay. Thus, the reward is determined only when enough time has elapsed since the last previous control to be able to properly observe the impact of the last previous control on the powers generated by the turbines.

4) Applying a Reinforcement Learning Method for Each Wind Turbine

This step is, for each wind turbine, applying a reinforcement learning method in order to determine a target yaw angle (or target operating point) of the turbine, according to the reward determined in step 3, and according to the previous yaw angle (or the previous operating point). The target yaw angle corresponds to a yaw angle setpoint for the turbine. The target operating point corresponds to an operating point setpoint. Reinforcement learning is, for an autonomous agent (a turbine of the wind farm here), the learning of the actions to be taken (yaw angle modification here) from experiments, so as to optimize a quantitative reward over time (here the reward determined in step 3, which takes the wake propagation delay into account). The agent is immersed in an environment (the wind farm and the wind here), and it makes decisions according to its current state (the current yaw angle here). In return, the environment provides the agent with a reward, which may be positive or negative. For the invention, it is a delayed-reward approach. The agent searches for an optimal strategy through past realizations insofar as it maximizes the sum of the rewards over time. This online learning approach is particularly interesting due to the modeling uncertainties. Furthermore, this approach enables real-time determination. Such a learning method is applied to each turbine of the wind farm, which allows optimization to be decentralized.

According to an embodiment of the invention, the reinforcement learning method can be a Watkins Q-learning method. Such a reinforcement learning method is notably described in "C. Watkins, P. Dayan, Technical Note-Q-learning, Machine Learning 8, 279-292 (1992), 1992 Kluwer Academic Publishers, Boston, Manufactured in the Netherlands". As a variant, other reinforcement learning methods can be used, which are notably learning methods known as policy-gradient methods of actor-critic type, or any similar learning method. In these approaches, each agent has two elements: an actor trying to predict the optimal control for the current state, and a critic that assesses the efficiency of the control predicted by the actor. Algorithms of this type are for example known as A2C (Advantage Actor Critic), DDPG (Deep Deterministic Policy Gradient), PPO (Proximal Policy Optimization).

Formally, for the embodiment implementing the reinforcement learning method using the Q-learning method, a Markov Decision Process (MDP) {S, A, r, P} can be defined, with S being the state space, A being an action space, and P being the environment transition probability matrix and r: S×A→R a reward function. In other words, at time t, an agent situated in a state $s_t$ selects an action at and receives an associated reward $r_t$. In the following, the continuous time step is denoted by t and the discrete time is denoted by k.

The application that associates with each observed state a corresponding action, or a probability distribution over the possible actions in this state which is referred to as policy π.

It is then the that an agent follows a policy π. The sequence of states, actions and rewards $\{s_0, a_0, r_0, s_1, a_1, \ldots, s_T, a_T, r_T\}$ observed by the agent when it interacts with the environment is referred to as trajectory. The trajectory followed depends on the agent policy and on the environment dynamics; for an action taken in a given state, the next state and the reward obtained are not always identical. It is stated then to be a probability of transition from one state to another. In the present case for example, exogenous factors such as the wind vagaries can increase or decrease the reward. One therefore seeks to maximize its expected return.

It can be written that A(s) is the subset of actions a ∈ A available in state s. An agent interacts with the environment by following a stochastic policy a~π(s), s∈ S, a∈ A(s), where π(a|s) is the probability of selecting action a when it is in state s. If the policy is deterministic, there is an action a' for which π(a'|s)=1, and it can be directly written a'=π(s). The goal of the agent is then to find an optimal strategy π* that maximizes the expectation E of the infinite sum of all its discounted rewards, which is also referred to as discounted return:

$$\max_\pi E[G] = \max_\pi E\left[\sum_k^\infty \beta^k r(s_k, a_k)\right]$$

with 0<β<1 being a discount factor (in other words, a weighting factor), so being an initial state, G being the discounted return, that is the sum of the discounted future rewards, and $\{s_k, a_k\}$: k=0 . . . ∞ the trajectory of the agent in the environment under policy π. For a policy π, it can be defined that the state-action value function $Q_\pi$ (or q function) for π being the expected discounted return for a state-action pair (a, s): $Q_\pi(s, a)=E[G|s_0=s, a_0=a]$, which results that, for any state-action pair (s, a), $Q_\pi(s, a)$ is the expected value for an agent that selects action a in state s, which then follows policy π for the rest of the trajectory. An optimal q function Q* can be defined such that ∀(s, a), Q*(s, a)=$\max_\pi Q_\pi(s, a)$.

To search for the best policy in a given environment, one may directly try to learn Q*. The Watkins Q-learning algorithm conserves estimates of q values for each pair (s, a). It is stated to be tabular. —In particular Dong et al. exploit and iteratively update an estimate $\hat{Q}$ of the optimal q function Q* at each time step k:

$$\hat{Q}_{k+1}(s_k, a_k) = \hat{Q}_k(s_k, a_k) + l_k \cdot TD_k$$

where $TD_k$ is the Bellman error estimator that can be defined as:

$$TD_k = r_k + \beta \max_{\overline{a} \in A(s_{k+1})} \hat{Q}_k(s_{k+1}, \overline{a}) - \hat{Q}_k(s_k, a_k)$$

with β∈ (0, 1) being a discount factor and $l_k$ being a learning rate at time step k. $\hat{Q}$ then converges with a probability of one towards Q* under certain reasonably achievable conditions. By following a decentralized approach where each turbine is modeled by an agent, M is considered (M being the number of turbines in the wind farm) with state spaces $S_{i\ (1 \leq i \leq M)}$:$S_i=Y\times R^2$ (with Y an allowable yaw angle space, and R is the set of real numbers) such that the state observed by an agent i at each time step k is defined by:

$s_{i,k}=[\gamma_{i,k}, w_k]^T \gamma_L \leq \gamma_{i,k} \leq \gamma_U$ with $\gamma_L$ and $\gamma_U$ respectively for the lower and upper limit of the yaw values, and $\gamma_{i,k}$ being the yaw angle of turbine i at time step k and $w_k$ being the acquired wind conditions at time step k, in other words, the wind speed and the wind direction. According to a non-limitative example, the action space can be defined as A={−1°, 0°, 1°}.

When there is a known delay c between the time when an action is sent to the environment and the time when the associated reward is collected by the agent, the environment is referred to as a delayed-reward environment. The time step delay ca is further considered, so that, with h the sampling period—i.e. the time in seconds between two iterations of the algorithm, we obtain $$c_d = \frac{c}{h} \cdot \lceil c_d \rceil$$

is then the number of time steps before the reward becomes available. This delay can be managed by allowing the agent to observe the history of all the states received and actions taken during the delay. As a variant, a modification can be made to the Watkins Q-learning method referred to as dQ(0): at time step k, instead of updating $\hat{Q}(s_k, a_k)$, updates are made for action $ă_k$ that takes effect at time step k. This flexible approach, readily adaptable to the decentralized case, enables management of the wake propagation delays in wind parks.

The present invention can implement a modification of the estimator update method in a reinforcement learning algorithm. For the Q-learning that updated $\hat{Q}(s_k, a_k)$ at time step k, updates can be made for action $a_{k-c_d}$ whose assessment of impact on the wind park production—i.e. the associated reward—has just been received. Matching can thus be restored by waiting ca time steps before updating $\hat{Q}$. This approach uses a definition of a reward delay c for each agent, which needs to correspond to the time required for the impact of an action to be fully observed on the downstream turbines. This time differs depending on the location of the turbine in the park, and the decentralized approach used in step 2 allows defining various reward delays for all the agents.

Thus, according to an embodiment, the reward delay at time step $c_i$ for each turbine i can correspond to the number of time steps corresponding to the greatest estimated delay of wake propagation to another turbine of the park. For this embodiment, the update of the Q-learning method for any wind turbine can be written as follows:

$$\hat{Q}_{si,k+1}\left(s_{k-c_i}, a_{k-c_i}\right) = \hat{Q}_{i,k}\left(s_{k-c_i}, a_{k-c_i}\right) + l_k \cdot TD_{dadQ,k}$$

$$TD_{dadQ,k} = r_{i,k} + \beta \max_{\bar{a} \in A(s_{i,k-c_i+1})} \hat{Q}_k\left(s_{i,k-c_i+1}, \bar{a}\right) - \hat{Q}_k\left(s_{i,k-c_i}, a_{i,k}\right)$$

with $(s_k, a_k) \sim b(a|s_k)$ the policy followed by an agent and guaranteeing a certain degree of exploration in the environment, $\beta \in (0, 1)$ is a discount factor and $l_k$ is a learning rate at time step k, s is the current state, that is the current yaw angle, a is the action, i.e. the yaw angle, r is the reward, $c_i$ is the time step corresponding to the greatest delay of wake propagation to another turbine of the park.

Once $\hat{Q}$ is determined, action a (that is the target yaw angle or the target operating point) is deduced. Then, a can therefore be selected according to a so-called exploration policy b(a/s) that selects argmax ($\hat{Q}(s, a')$) with the highest probability, and all the other actions with non-zero probabilities.

According to an embodiment, a Boltzmann exploration policy can be selected:

$$b(a'|s) = \frac{e^{\frac{\hat{Q}(s,a')}{\tau}}}{\sum_j e^{\frac{\hat{Q}(s,a)}{\tau}}}$$

with τ=0.1. The greater τ, the more the exploration is in an attempt to find better actions. The smaller τ, the more the trend is to systematically select the best action according to our current estimates. It is also possible to reduce t throughout the learning process.

5) Controlling Each Wind Turbine

This step controls each wind turbine by applying the target yaw angle (or the target operating point) determined in step 4. In this step, for each turbine, the actuator of the operating point of the turbine is controlled. Notably, the yaw angle actuator of the turbine can be controlled.

According to an embodiment, control of the yaw angle can correspond to a variation by a fixed pitch of the yaw angle. In other words, the yaw angle can be increased by a fixed pitch or decreased by a fixed pitch, or it may remain constant. The fixed pitch can range between 0.5 and 5 degrees, preferably between 0.5 and 2 degrees, and it can be 1 degree. This embodiment allows prevention of sudden yaw angle changes and, therefore, sudden wake changes.

As a variant, control of the yaw angle can correspond to a control at a precise value of the yaw angle.

Furthermore, the invention concerns wind farms. Each turbine of the wind farm comprises an actuator for modifying the yaw angle of the turbine or the operating point of the turbine. Besides, the wind farm comprises computing devices, notably a computer, a processor or a calculator for implementing the control method according to any one of the variants or variant combinations described below. The wind farm is thus controlled by the computing devices. In particular, the computing devices allows:

acquire the powers generated by the wind turbines;
acquire the yaw angles of each wind turbine;
determine the wake propagation delay of each wind turbine;
determine a target yaw angle for each wind turbine or a target operating point; and
control the yaw angle of each wind turbine or the operating point.

The computing operation can be centralized: the wind farm comprises a single computer for implementing the steps of the control method, which communicates at a minimum with all the yaw angle actuators. Alternatively, each wind turbine comprises a computer, and all the computers communicate with each other.

According to an embodiment, the wind farm can comprise a wind sensor, notably a LiDAR sensor or an anemometer.

According to an aspect of the invention, the wind farm can comprise SCADA measuring devices.

According to an embodiment option, the wind farm can comprise communications, notably intended to transmit at least one of data acquired in step 1 and communicate the target yaw angles to the controllers.

Examples

Other features and advantages of the method according to the invention will be clear from reading the application examples hereafter.

Figure 3A:
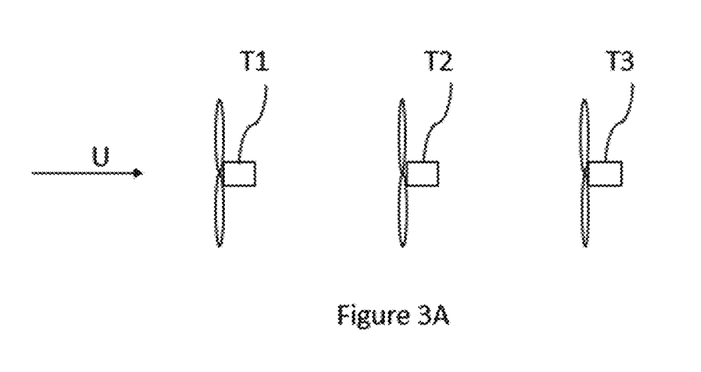
FIG. 3 illustrates two wind farm implementations for two examples.
Figure 3B:
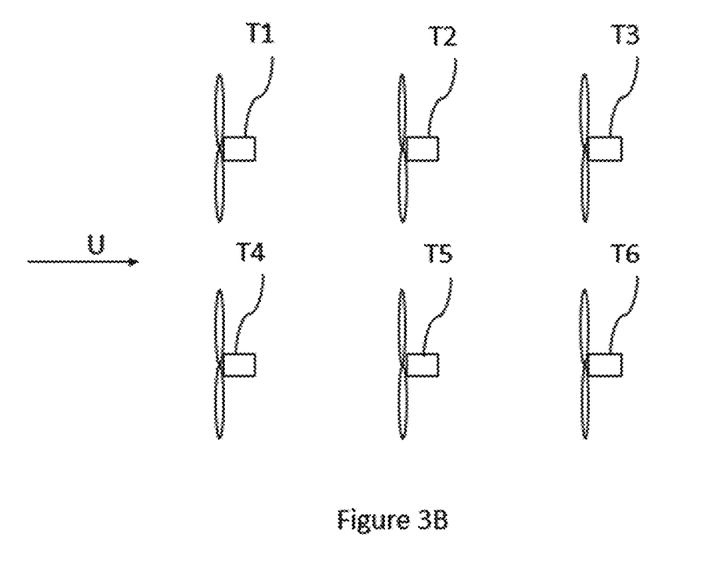

For these examples, two wind farms are considered. The two wind farms are schematically illustrated, by way of non-limitative example, in FIG. 3. FIG. 3A corresponds to the first wind farm, comprising three aligned identical wind turbines denoted by T1, T2, T3, which are 5-MW turbines with a diameter of 126 m. The turbines are separated by a distance of four diameters. For this first example, the wind U is parallel to the wind turbine alignment (which corresponds to the worst situation in terms of wake effect). FIG. 3B corresponds to the second wind farm comprising two parallel lines of three aligned identical wind turbines. The turbines, denoted by T1, T2, T3, T4, T5 and T6, are 5-MW turbines with a diameter of 126 m. Within an alignment, the turbines are separated by a distance of four diameters, and the two alignments are separated by a distance of four diameters. For this second example, wind U is parallel to the turbine alignments (which corresponds to the worst situation in terms of wake effect). In order to reproduce realistic wind conditions, a turbulent wind simulator is used to generate a time series of 3D wind speed vectors in the flow field. The simulated wind has an average free flow speed of 8 m/s with an 8% turbulence. The examples are simulated on a wind park simulator FAST.Farm developed by the National Renewable Energy Laboratory (NREL) which is a simulator that accounts for the complex dynamics of wake effects, including speed deficits, advection, deflection, meandering and wake merging in the presence of multiple turbines. For the simulations, the sampling period is set to three seconds.

Figure 4A:
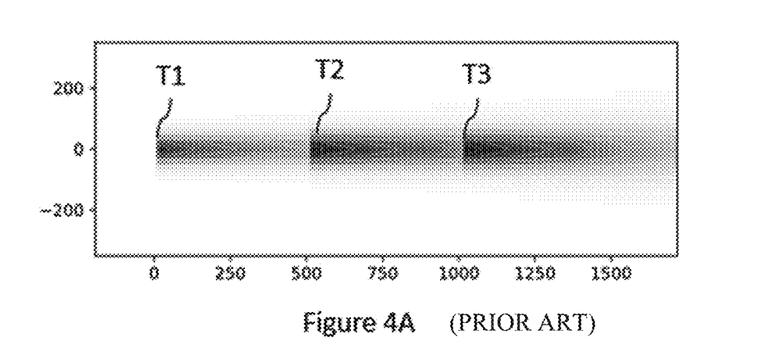
FIG. 4 illustrates, for the two examples of FIG. 3, the wake effect of each wind turbine, with a control method according to the prior art.
Figure 4B:
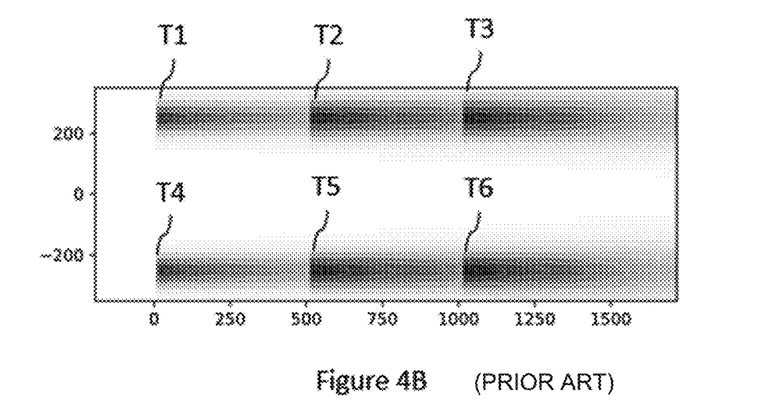

FIG. 4 schematically illustrates the wake formed by the two wind farms in the case where the yaw angle remains zero for all the turbines. FIG. 4A corresponds to the wind farm of FIG. 3A, and FIG. 4B corresponds to the wind farm of FIG. 3B. In this figure, the darker the area, the greater the wake effect. It is noted that the wake effect is greater for the last turbine of each alignment (T3 for FIG. 4A, T3 and T6 for FIG. 4B). Therefore, the power generated by the turbines, notably those at the end of the alignments in the direction of the wind, is greatly disturbed, which impacts the total power generation of the wind farm.

We have subsequently applied the control method according to the invention by implementing the Watkins Q-learning method with delayed reward management, as described above, over a period of 600,000 s, corresponding to 230,000 iterations. The action space of each agent is limited to 3 actions: $\{-1°, 0°, 1°\}$, for a corresponding yaw angle increase or decrease (in other words, the target yaw angle can increase by 1°, remain constant or decrease by) 1°. For the first example, 3 Q-tables of size 63×3 are learned, that is 189 parameters. For the second example, we learn 6 Q-tables of size 63×6 are learned, which are 378 parameters. A window is used for the power average of $\lambda=10$ min. In order to assess the algorithm performances without any prior knowledge, all the values of the Q-table are initialized at $q0=0.15$. The yaws are initialized at 0°, which corresponds to a naive and greedy strategy where all the turbines are designed to face the wind.

Figure 5:
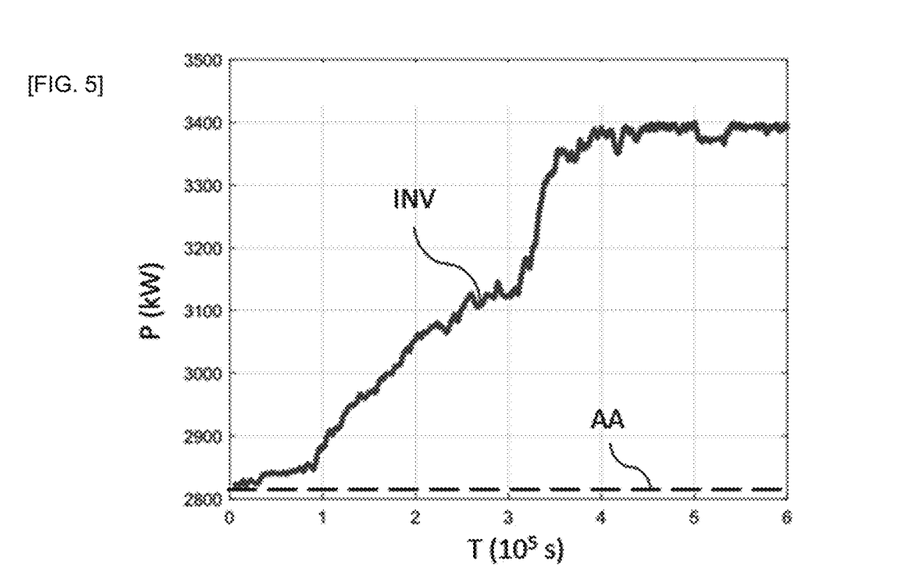
FIG. 5 illustrates, for the first example, curves of the total power generated by the wind farm as a function of time, for a method according to the prior art and for the method according to an embodiment.

FIG. 5 illustrates, for the first example, the total power curves P in kW generated by the wind farm as a function of time T in seconds (it is the sum of the powers generated by all the turbines). Curve AA corresponds to a method where all the yaw angles are kept at 0°, and curve INV corresponds to the method according to the invention. In relation to the power generated with the greedy strategy (where all the yaws are at) 0°, the method according to the invention increases the total power generated by the wind farm by 20%.

Figure 6:
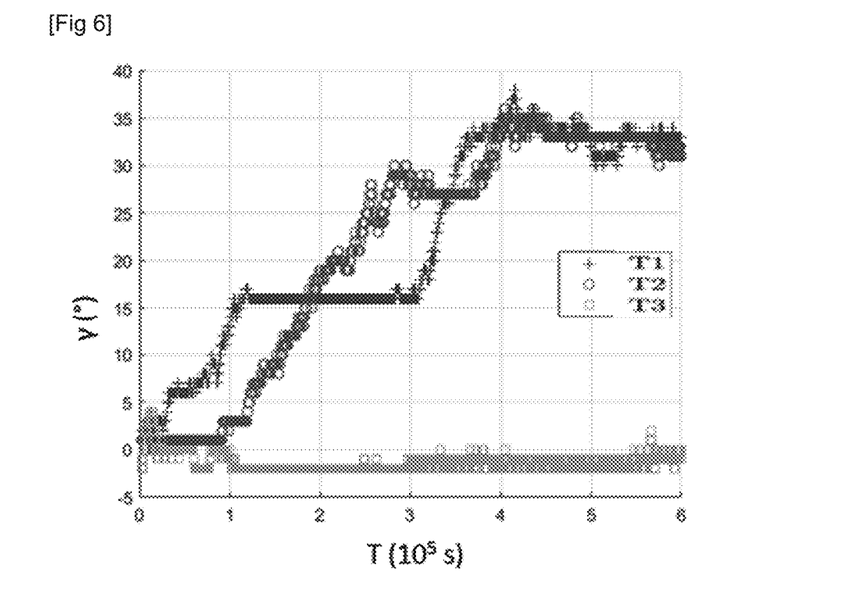
FIG. 6 illustrates, for the first example, the yaw angle curves of each wind turbine as a function of time.

FIG. 6 illustrates, for the first example, the yaw angles $\lambda$ in ° for each turbine T1 to T3 as a function of time T in seconds. It is noted that the yaw angles of the first two turbines T1 and T2 in the wind direction vary greatly. These two turbines are therefore greatly misaligned with the wind direction to maximize the power generated. On the other hand, the yaw angle of last turbine T3 in the wind direction has only slightly changed.

Figure 7:
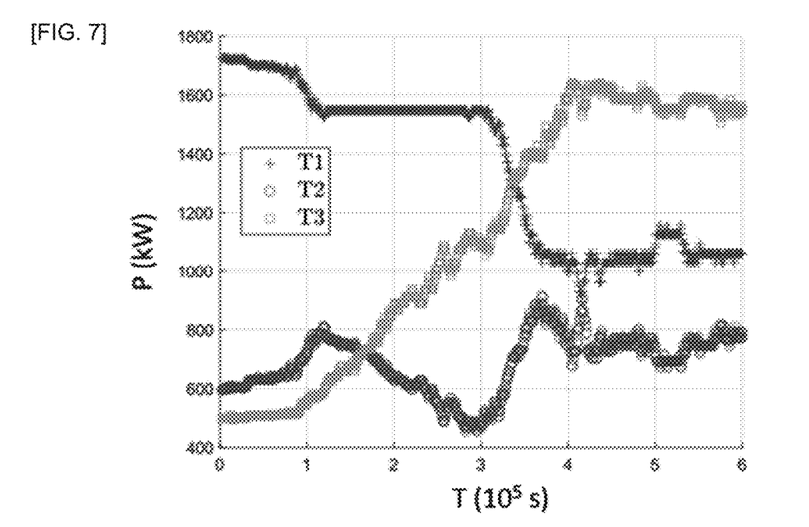
FIG. 7 illustrates, for the first example, the generated power curves for each wind turbine as a function of time.

FIG. 7 illustrates, for the first example, the power P in kW generated for each wind turbine T1 to T3 as a function of time T in seconds. It is noted that the power of turbine T1 is degraded due to its misalignment. However, the powers generated by turbines T2 and T3 are increased, in particular for turbine T3 whose power generation is multiplied by three.

Figure 8:
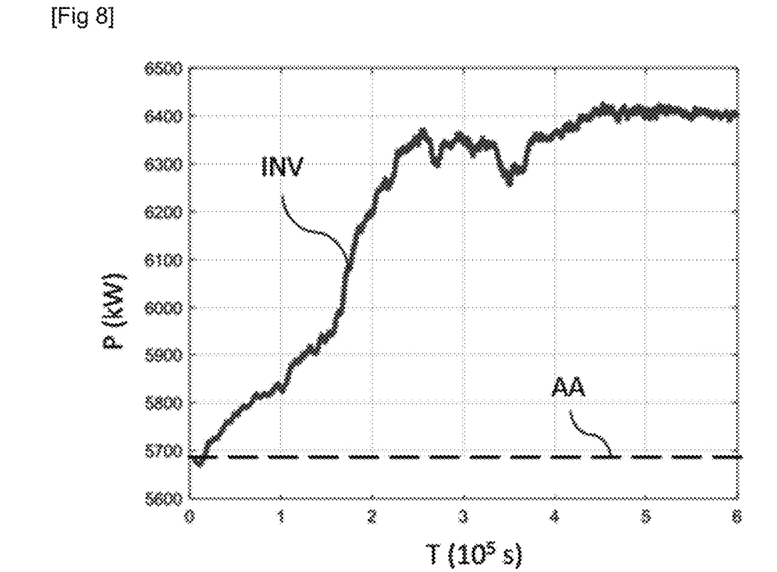
FIG. 8 illustrates, for the second example, curves of the total power generated by the wind farm as a function of time, for a method according to the prior art and for the method according to an embodiment.

FIG. 8 illustrates, for the second example, the total power curves P generated by the wind farm in kW as a function of time T in seconds (it is the sum of the powers generated by all the turbines). Curve AA corresponds to a method where all the yaw angles are kept at 0°, and curve INV corresponds to the method according to the invention. In relation to the power generated with the greedy strategy (where all the yaws are at) 0°, the method according to the invention increases the total power generated by the wind farm by 14%.

Figure 9:
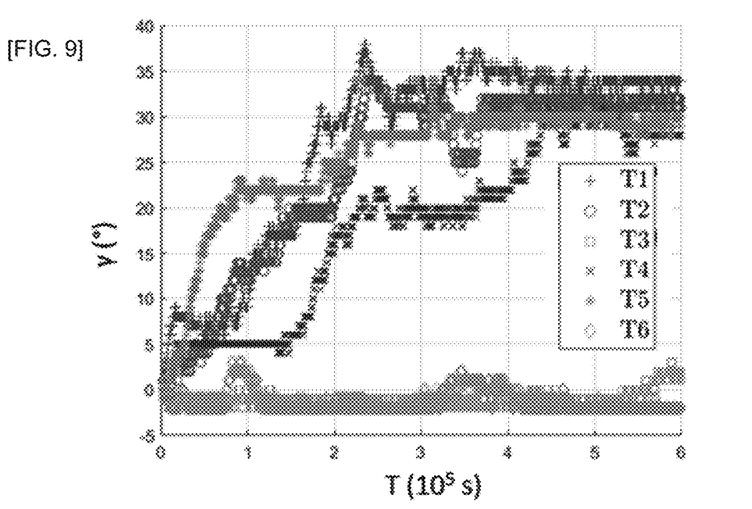
FIG. 9 illustrates, for the second example, the yaw angle curves of each wind turbine as a function of time.

FIG. 9 illustrates, for the second example, the yaw angles $\lambda$ in ° for each turbine T1 to T6 as a function of time T in seconds. It is noted that the yaw angles of the first two turbines T1, T2, T4 and T5 of each alignment in the wind direction vary greatly. Therefore these two turbines are greatly misaligned with the wind direction to maximize the power generated. On the other hand, the yaw angle of the last turbines T3 and T6 of the two alignments in the wind direction has only slightly changed.

Figure 10:
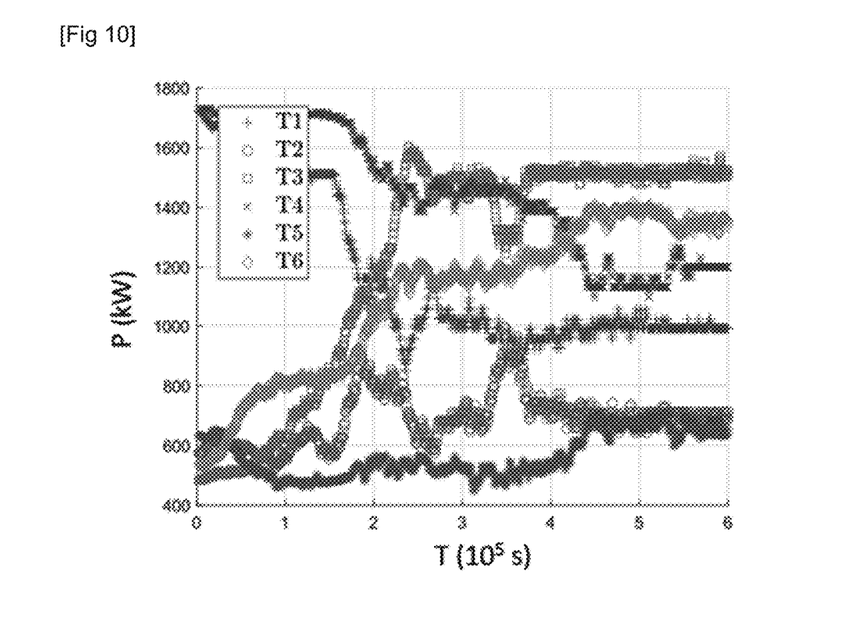
FIG. 10 illustrates, for the second example, the generated power curves for each wind turbine as a function of time.

FIG. 10 illustrates, for the second example, the power P in kW generated for each wind turbine T1 to T6 as a function of time T in seconds. It is noted that the powers generated by turbines T1 and T4 are degraded due to their misalignment. However, the powers generated by turbines T2, T3, T5 and T6 are increased, in particular for turbines T3 and T6 whose power generation is multiplied by three.

It can further be noted that, for these two examples, the algorithm converges around 450,000 s, which corresponds to 150,000 iterations. Although the farm has doubled in size between the two examples, the convergence time remains substantially the same, which is a key advantage in relation to centralized approaches or those using turbine locking. Furthermore, as expected, the turbine pairs having the same position in the alignments converge towards similar values. These results validate the management of delayed reward by the present invention for decentralized and delay-sensitive Q-learning, under realistic turbulent wind conditions and with dynamic wake simulation. Besides, these results show that the method according to the invention maximizes the total power generation, that it adapts to several wind farm configurations, and that it enables real-time control with fast convergence.

The invention claimed is:

1. A method of control of a wind farm comprising wind turbines, each wind turbine of the wind farm, comprising an actuator for modifying an operating point including a yaw angle of each turbine with the yaw angle being an angle formed between a rotor of the turbine and a wind direction, comprising steps of:
   a. acquiring power generated by each wind turbine, the wind speed, the wind speed direction, and the yaw angle of each turbine;

b. for each wind turbine, determining a wake propagation delay formed by the turbine, according to the acquired wind speed and direction, and a layout of the wind turbines within the wind farm;
c. for each wind turbine, determining a value of a reward representing an impact of control of the turbine on a sum of power generated by all the turbines of the wind farm with the reward being calculated by accounting for the determined wake propagation delay;
d. for each wind turbine, applying a reinforcement learning method to determine a target operating point of the turbine according to the determined value of a reward and a previous yaw angle; and
e. controlling the operating point of each wind turbine by applying the determined target operating point using the actuator.

2. The wind farm control method as claimed in claim 1, wherein the wake propagation delay is determined by use of Taylor's frozen turbulence hypothesis.

3. The wind farm control method as claimed in claim 2, wherein the wake propagation delay is determined by accounting for a wake distance limit.

4. The wind farm control method as claimed in claim 3, wherein for each wind turbine, the reward is determined when a time elapsed since the last control by the actuator is greater than the determined wake propagation delay.

5. The wind farm control method as claimed in claim 3, wherein the wind speed and the wind direction are acquired by measuring with one of a LiDAR sensor, an anemometer, a real-time control, and a data acquisition system.

6. The wind farm control method as claimed in claim 2, wherein for each wind turbine, the reward is determined when a time elapsed since the last control by the actuator is greater than the determined wake propagation delay.

7. The wind farm control method as claimed in claim 2, wherein the wind speed and the wind direction are acquired by measuring with one of a LiDAR sensor, an anemometer, a real-time control, and a data acquisition system.

8. The wind farm control method as claimed in claim 1, wherein the wake propagation delay is determined by accounting for a wake distance limit.

9. The wind farm control method as claimed in claim 8, wherein the reinforcement learning method is a Watkins Q-learning method.

10. The wind farm control method as claimed in claim 8, wherein for each wind turbine, the reward is determined when a time elapsed since the last control by the actuator is greater than the determined wake propagation delay.

11. The wind farm control method as claimed in claim 8, wherein the wind speed and the wind direction are acquired by measuring with one of a LIDAR sensor, an anemometer, a real-time control, and a data acquisition system.

12. The wind farm control method as claimed in claim 1, wherein the reinforcement learning method is a Watkins Q-learning method.

13. The wind farm control method as claimed in claim 12, wherein the reinforcement learning method is a Watkins Q-learning method.

14. The wind farm control method as claimed in claim 12, wherein the wind speed and the wind direction are acquired by measuring with one of a LiDAR sensor, an anemometer, a real-time control, and a data acquisition system.

15. The wind farm control method as claimed in claim 1, wherein for each wind turbine, the reward is determined when a time elapsed since the last control by the actuator is greater than the determined wake propagation delay.

16. The wind farm control method as claimed in claim 1, wherein the operating point is the yaw angle and the control of the yaw angle is a variation of a fixed pitch of the yaw angle.

17. The wind farm control method as claimed in claim 16, wherein the acquired yaw angle is the previous controlled yaw angle.

18. The wind farm control method as claimed in claim 1, wherein the wind speed and the wind direction are acquired by measuring with one of a LiDAR sensor, an anemometer, a real-time control, and a data acquisition system.

19. The wind farm control method as claimed in claim 1, wherein the reward is determined by accounting for an average of the electrical powers generated during a predetermined time interval.

20. A wind farm, wherein each wind turbine of the wind farm comprises the actuator for modifying an operating yaw point of the turbine with the yaw angle being the angle formed between the rotor of the turbine and the wind direction and wherein the wind farm comprises a computer system for implementing the wind farm control method according to claim 1.

* * * * *